US006644899B2

(12) United States Patent
Ebehard

(10) Patent No.: US 6,644,899 B2
(45) Date of Patent: Nov. 11, 2003

(54) DRILL BIT AND PROCESS OF PRODUCING A DRILL BIT WITH IMPROVED CUTTING EDGES

(75) Inventor: Helmut Ebehard, St. Joseph (AT)

(73) Assignee: Johann Eberhard Gesellschaft m.b.H., St. Josef (AT)

( * ) Notice: Subject to any disclaimer, the term of this patent is extended or adjusted under 35 U.S.C. 154(b) by 0 days.

(21) Appl. No.: 10/233,447

(22) Filed: Sep. 3, 2002

(65) Prior Publication Data

US 2003/0068208 A1 Apr. 10, 2003

Related U.S. Application Data

(63) Continuation of application No. PCT/AT01/00053, filed on Feb. 27, 2001.
(60) Provisional application No. 60/255,291, filed on Dec. 13, 2000.

(30) Foreign Application Priority Data

Mar. 3, 2000 (AT) ........................................... 357/2000

(51) Int. Cl.[7] ................................................ B23B 51/00
(52) U.S. Cl. ........................ 408/227; 408/213; 408/229
(58) Field of Search ......................... 408/204, 205–207, 408/213, 223–225, 227, 229, 703, 230; 30/301, 302, 316, 355; 76/108.1

(56) References Cited

U.S. PATENT DOCUMENTS 3,745,869 A * 7/1973 Ludwig ....................... 30/355
5,695,304 A 12/1997 Ebert
5,975,814 A * 11/1999 Pomp ......................... 408/213
6,030,155 A * 2/2000 Scheer et al. ............... 408/223
6,354,774 B1 * 3/2002 Haughton et al. .......... 408/213
6,394,714 B2 * 5/2002 Eberhard .................... 408/213

FOREIGN PATENT DOCUMENTS

| | | | | | |
|---|---|---|---|---|---|
| CH | 670 985 | | | 12/1986 | |
| DE | 1611733 | A | * | 1/1971 | ................. 408/204 |
| DE | 197 02 423 | | | 1/1997 | |
| DE | 299 11 945 | U1 | | 10/1999 | |
| EP | 0 855 257 | A2 | | 12/1997 | |
| EP | 0 870 561 | A1 | | 4/1998 | |
| FR | 2529504 | A | * | 1/1984 | ................. 408/204 |
| GB | 1505113 | A | * | 3/1978 | ........... B23D/31/00 |
| SU | 1653910 | A | * | 6/1991 | ................. 408/204 |
| WO | 97/31742 | | | 9/1997 | |

* cited by examiner

*Primary Examiner*—Steven C. Bishop
(74) *Attorney, Agent, or Firm*—Henry M. Feiereisen; Ursula B. Day

(57) ABSTRACT

The invention relates to a drill, especially a Forstner bit or a multi-spur machine bit having a drill shaft and a cutter head and provided with a central mandrel, a first and second spur cutter radially extending towards the outside from said mandrel and in opposite tool approach directions; a respective hollow cylinder segment wall has a circumference cutter defining the circumference of the cutter head and is joined to the ends of the first and second spur cutter, said ends facing the circumference, wherein the wall defines a chip space facing away from the spur cutter and opening to the respective remaining spur cutter and leading to the drill head, and wherein the two cutters are provided with wave-shaped cavities and elevations at least partially along the sides thereof.

3 Claims, 2 Drawing Sheets

DRILL BIT AND PROCESS OF PRODUCING A DRILL BIT WITH IMPROVED CUTTING EDGES

CROSS-REFERENCES TO RELATED APPLICATIONS

This application claims the benefit of prior filed provisional application, Appl. No. 60/255,291, filed on Dec. 13, 2000, pursuant to 35 U.S.C. 119(e), the subject matter of which is incorporated herein by reference.

This application claims the priority of Austrian Patent Application Serial No. A 357/2000, filed Mar. 3, 2000, the subject matter of which is incorporated herein by reference.

This application is a continuation of prior filed copending PCT International application no. PCT/AT01/00053, filed on Feb. 21, 2001.

FIELD OF THE INVENTION

The invention relates to a drill, and in particular to a Forstner bit or multi-spur machine bit, having a drill stem and a cutter head, which has a central mandrel, from which a first end cutting edge and a second end cutting edge extend radially outward in opposite in-feed directions. In each case, the cutting head is delimited at the periphery by one wall, which is in the form of a segment of a hollow cylinder and has a peripheral cutting edge adjoining the peripheralside ends of the first and second end cutting edges. At its end, which is remote from the end cutting edge, the wall delimits a chip space which in each case opens out toward the other end cutting edge and penetrates through the drilling head.

BACKGROUND OF THE INVENTION

Drills of this type are mass-produced products, which are intended for use in handheld, pillar, dowel or in-line multiple-spindle drilling machines and are produced and sold in large numbers. They can be used to drill holes with a relatively large diameter into a very wide range of materials, from plastic-coated chipboards, glued wooden boards through to acrylic plastic sheets and other base materials. The drawback of drills which have become known hitherto are the relatively high drilling forces or torques which have to be applied by the drilling machines, since the straight edges of the end cutting edges and the peripheral cutting edges have to overcome a high resistance from the material.

Accordingly, the peripheral cutting edges of known drills of this type tend to overheat on account of the high level of load during the drilling operation, which becomes apparent from a blue start-up mark. This leads to permanent damage to the drill. To avoid this overheating effect, peripheral cutting edges with a tooth-like design have been used. However, these lead to a failure of the drill to cut cleanly and to the drilled hole tearing open.

It would therefore be desirable and advantageous to provide an improved drill to obviate prior art shortcomings and to reduce the wearing tendency on the drill.

Accordingly, an object of the present invention to provide an improved drill of the type as described herein obviating the afore-stated drawbacks.

SUMMARY OF THE INVENTION

According to one aspect of the present invention, an improved drill of the type as described herein is provided obviating the afore-stated drawbacks. In particular, it is an aspect of the present invention to provide an improved drill with the aid of which it is possible to increase the efficiency of the energy employed for a drilled hole to be made and with which it is possible to carry out drilling operations using low drilling forces, with the material load on the drill being kept at a relatively low level.

These aspects, and others which will become apparent hereinafter, are attained in accordance with the present invention by providing drill, especially a Forstner bit or multi-spur machine bit, which includes a drill stem and a cutter head, which has a central mandrel, from which a first end cutting edge and a second end cutting edge extend radially outward in opposite in-feed directions, in each case one wall, which delimits the periphery of the cutting head, is in the form of a segment of a hollow cylinder and has a peripheral cutting edge, adjoining the peripheral-side ends of the first and second end cutting edges, which wall, at its end which is remote from the end cutting edge, delimits a chip space which in each case opens out toward the other end cutting edge and penetrates through the drilling head, and wherein the two peripheral cutting edges have undulating recesses and elevations at least along part of their profile.

The present invention resolves prior art problems by so configuring the drill that the undulating peripheral cutting edges, which act as taper taps, reduce the constant friction within the drilling material which occurs with known peripheral cutting edges to more or less punctiform friction, thus avoiding permanent rubbing. Consequently, a lower drilling machine torque is required to drill a hole, and consequently the drill penetrates into the wood, for example, considerably more easily.

In a further refinement of the invention, it is possible to provide for the undulating recesses and elevations to be formed by cylindrical grinding.

Forming a cylindrically ground profile on the peripheral cutting edge ensures very clean cutting on the part of the drill and prevents the drilled hole from tearing open.

Furthermore, the invention relates to a process for producing a drill, especially a Forstner drill or a multi-spur machine bit. Accordingly, it is a further aspect of the invention to allow automated machining of the cutting edges of a drill in a technically simple and precise way.

In accordance with the invention, this is achieved by the fact that undulating recesses and elevations are hard-milled into the peripheral cutting edges of the hardened drilling head along its profile.

After the drill bit blank has been hardened, the drill stem is ground, and then the elevations and recesses are hard-milled using a hard-milling machine, in particular so as to form a cylindrically-ground profile. In this way, it is possible to achieve a highly accurate configuration of the peripheral cutting edges.

BRIEF DESCRIPTION OF THE DRAWING

The following figures depict certain illustrative embodiments of the invention in which like reference numerals refer to like elements. These depicted embodiments are to be understood as illustrative of the invention and not as limiting in any way.

The above and other objects, features and advantages of the present invention will now be described in more detail with reference to the accompanying drawing in which.

DETAILED DESCRIPTION OF PREFERRED EMBODIMENTS

Figure 1:
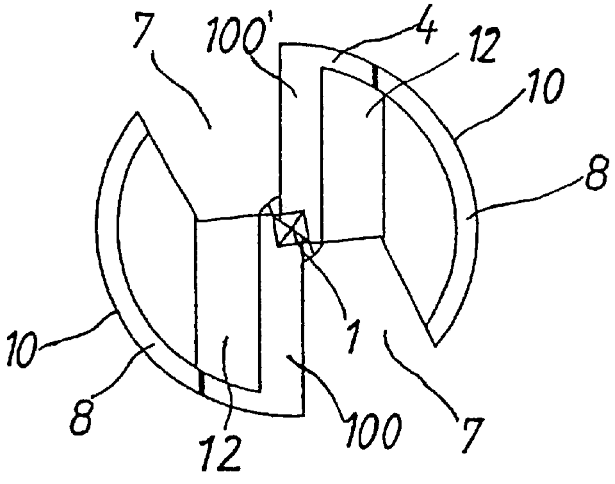
FIG. 1 shows an end view of an embodiment of the drill according to the present invention.

Throughout all the Figures, same or corresponding elements are generally indicated by same reference numerals.

Figure 2:
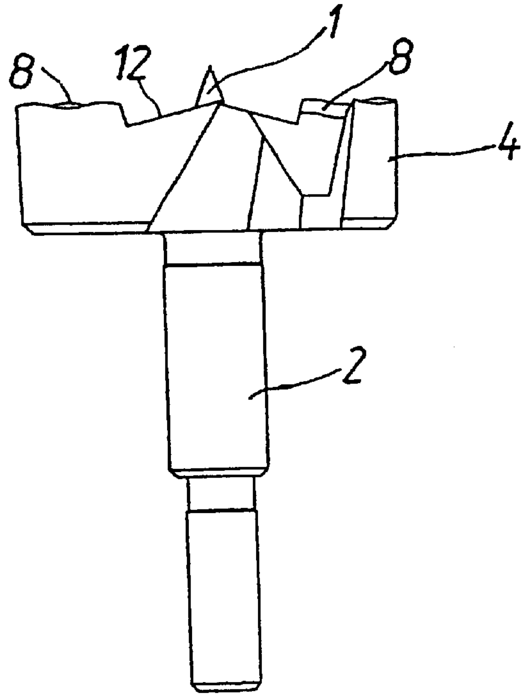
FIG. 2 shows a side view of the drill illustrated in FIG. 1.
Figure 3:
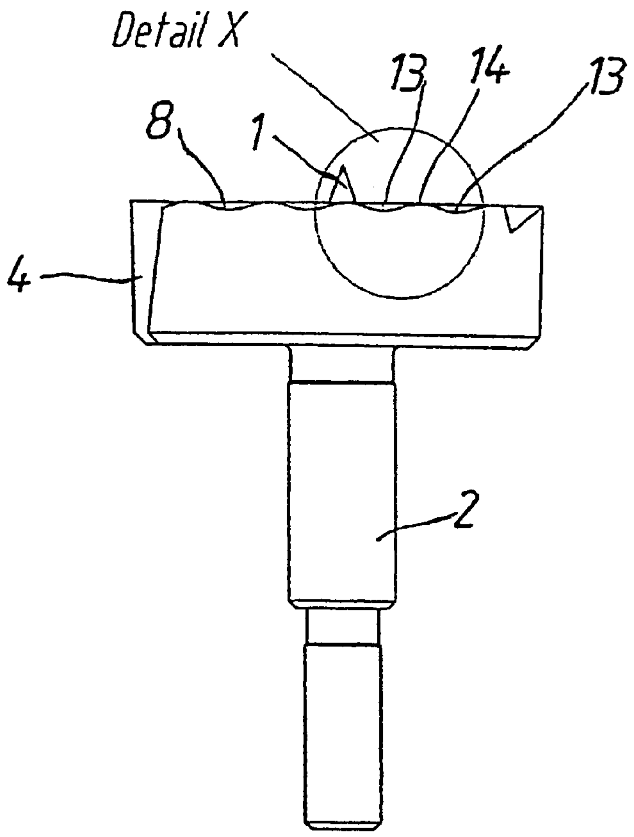
FIG. 3 shows a view which has been rotated through 90° compared to the illustration shown in FIG. 2.
Figure 4:
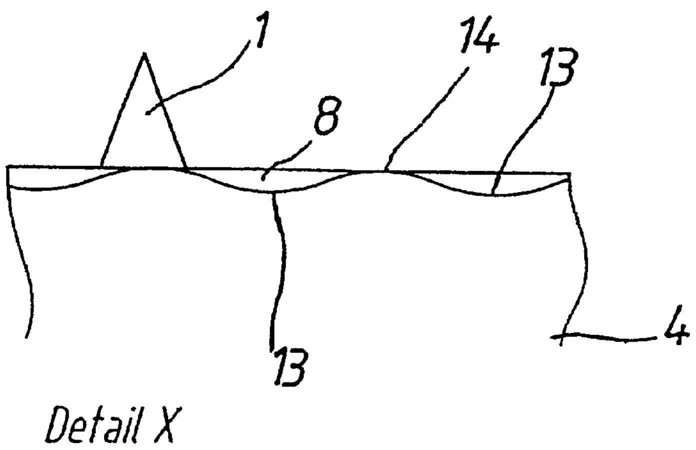
FIG. 4 shows a detail of the view shown in FIG. 3.

Turning now to the drawing, and in particular to FIG. 1 and FIG. 2, there is shown a Forstner bit, which is substantially composed of a drill stem 2, which is to be clamped into a chuck, and a cutter head 4. The cutter head 4 has a protruding central mandrel 1, from which a first and a second end cutting edge 100, 100' extend radially outward in opposite in-feed directions. In the exemplary embodiment shown in FIG. 1, the central mandrel tapers to a point in the form of a pyramid, allowing accurate positioning of the drill onto a marker for a drilled hole. The mandrel 1 penetrates sufficiently far into the material, which is to be drilled to prevent the drill from slipping when the drilling machine starts to operate.

In each case, one wall 10 is in the form of a segment of a hollow cylinder delimiting the periphery of the cutter head 4 and has a peripheral cutting edge 8 adjoining the peripheral-side ends of the first and second end cutting edges 100, 100'. The wall, at its end which is remote from the end cutting edge, delimits a chip space 7 which in each case opens out toward the other end cutting edge and penetrates through the drilling head. A surface 12 which in each case drops toward the adjoining wall 10 runs from the end cutting edges 100, 100'.

To avoid overheating of the peripheral cutting edges 8, the two peripheral cutting edges 8 have undulating recesses 13 and elevations 14 along their profile. The undulating recesses 13 and elevations 14 may also run only along partial regions of peripheral cutting edges 8.

The undulating recesses 13 and elevations 14 are preferably formed by cylindrical grinding.

The invention can be applied to a Forstner bit, a multi-spur machine bit or a similar wood-drilling bit.

The production of the drill according to the invention involves the following steps.

Forging of the blank, and if appropriate burnishing the blank

Hardening the drill

Grinding the drill stem

Hard-milling of the elevation/recesses or the cylindrically-ground profile from the hardened drilling head.

While the invention has been illustrated and described as embodied in a drill, in particular a Forstner bit or a multi-spur machine bit, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A drill bit comprising, a drill stem and a cutter head having a central mandrel, from which a first end cutting edge and a second end cutting edge extend radially outward in opposite in-feed directions, each forming a portion of a cutter head, said each portion of the cutter head is peripherally delimited by a wall in the form of a segment of a hollow cylinder provided with peripheral cutting edges, said segment adjoining peripheral-side ends of the first and second end cutting edges, at an end remote from the end cutting edge is delimiting a chip space opening out toward the other end cutting edge and extending through the drilling head, wherein the two peripheral cutting edges are configured with at least a partial profile of sequences of undulating recesses and elevations.

2. The drill bit as claimed in claim 1, wherein the undulating recesses and elevations of the peripheral cutting edges are hardmilled.

3. A process for producing a drill bit, in particular a Forstner bit or a multi-spur machine bit, comprising the steps of providing a hardened blank drill bit with peripheral cutting edges and hard-milling sequences of undulating recesses and elevations into the peripheral cutting edges at least along a portion of a profile of the cutting edges.

* * * * *

UNITED STATES PATENT AND TRADEMARK OFFICE

CERTIFICATE OF CORRECTION

PATENT NO. : 6,644,899 B2
DATED : November 11, 2003
INVENTOR(S) : Helmut Eberhard It is certified that error appears in the above-identified patent and that said Letters Patent is hereby corrected as shown below:

Title page,
Item [75], Inventors, correct sole inventor's last name to -- Eberhard --.

Signed and Sealed this

Twenty-third Day of March, 2004

JON W. DUDAS
*Acting Director of the United States Patent and Trademark Office*